(12) United States Patent
Rodriguez

(10) Patent No.: US 10,308,122 B2
(45) Date of Patent: Jun. 4, 2019

(54) HEAVY CABLE COUNTER BALANCE DEVICE

(71) Applicant: Alternative Engineering, Inc., Belmont, MI (US)

(72) Inventor: D. Robert Rodriguez, Ada, MI (US)

(73) Assignee: Alternative Engineering, Inc., Belmont, MI (US)

( * ) Notice: Subject to any disclaimer, the term of this patent is extended or adjusted under 35 U.S.C. 154(b) by 201 days.

(21) Appl. No.: 15/277,043

(22) Filed: Sep. 27, 2016

(65) Prior Publication Data

US 2018/0086216 A1 Mar. 29, 2018

(51) Int. Cl.
*B60L 11/18* (2006.01)
*B60L 53/16* (2019.01)
*B60L 53/30* (2019.01)
*H02J 7/00* (2006.01)
*F16F 15/28* (2006.01)
*B60L 53/35* (2019.01)
*B60L 53/18* (2019.01)

(52) U.S. Cl.
CPC .......... *B60L 11/1818* (2013.01); *B60L 53/16* (2019.02); *B60L 53/18* (2019.02); *B60L 53/30* (2019.02); *B60L 53/35* (2019.02); *F16F 15/28* (2013.01); *H02J 7/0045* (2013.01); *B60L 2200/42* (2013.01); *H02J 7/0027* (2013.01); *Y02T 10/7005* (2013.01); *Y02T 10/7088* (2013.01); *Y02T 90/121* (2013.01); *Y02T 90/125* (2013.01); *Y02T 90/14* (2013.01)

(58) Field of Classification Search
CPC .. B60L 11/1818; B60L 11/1827; B60L 53/35; B60L 53/16; B60L 53/18; B60L 53/30; F16F 15/28; H02J 7/0045
USPC ......................................... 320/109
See application file for complete search history.

(56) References Cited

U.S. PATENT DOCUMENTS

| | | | | |
|---|---|---|---|---|
| 4,496,896 A | * | 1/1985 | Melocik | B60K 1/04 320/108 |
| 6,622,653 B1 | * | 9/2003 | Starnes, Jr. | A01K 5/01 119/51.01 |
| 9,418,345 B1 | * | 8/2016 | Meehan | G06Q 10/02 |
| 2005/0046387 A1 | * | 3/2005 | Aker | H02J 7/0042 320/125 |
| 2013/0257373 A1 | * | 10/2013 | Mallon, IV | B60L 11/1824 320/109 |
| 2014/0150820 A1 | * | 6/2014 | Yoo | A47L 9/009 134/6 |

* cited by examiner

*Primary Examiner* — Stacy Whitmore
(74) *Attorney, Agent, or Firm* — Frank M. Scutch, III

(57) ABSTRACT

A heavy cabling counterbalance device includes a base portion having a plurality of legs where a battery charger having a charging cable is configured on the base portion. A charging stand having a charging arm and counterweight operates where the charging arm can be easily raised or lowered about a center of gravity such that the charging cable can be connected to a forklift positioned adjacent the base portion for charging its battery.

11 Claims, 6 Drawing Sheets

100

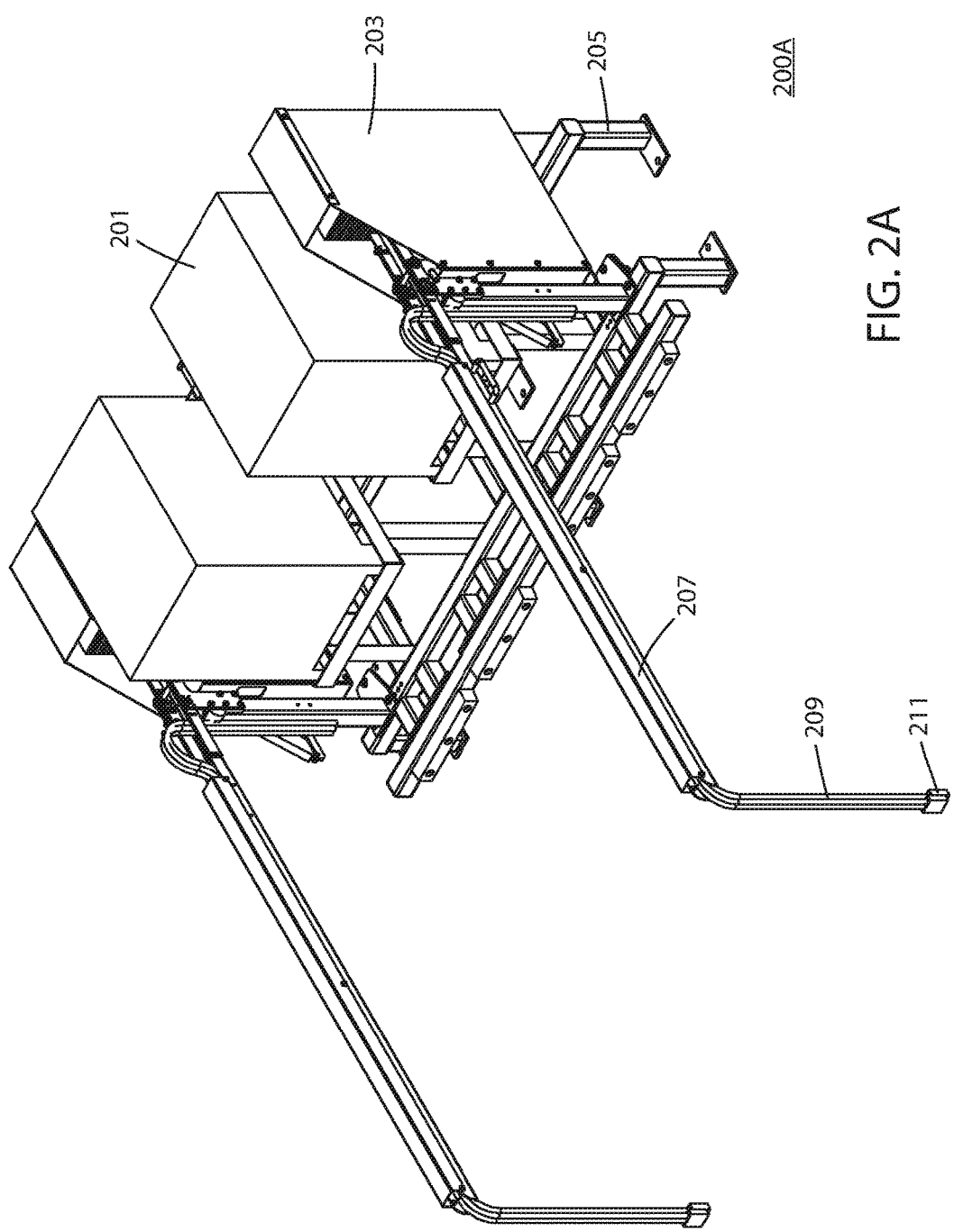

HEAVY CABLE COUNTER BALANCE DEVICE

FIELD OF THE INVENTION

The present invention relates generally to electric vehicle charging and more particularly to charging the battery in an electric vehicle using a charger with heavy cabling.

BACKGROUND

Electric vehicles such as forklifts, lift trucks, fork trucks are electric powered industrial vehicles used to lift and move materials short distances. The use and development of the forklift truck has greatly expanded worldwide. Electric vehicles have become an indispensable piece of equipment in manufacturing and warehousing operations. Electric forklifts are powered by either a battery or by fuel cells that provide power to the AC or DC electric motors. The electric vehicle is typically driven to a recharging station where heavy cabling is dragged into position in order to charge the batteries on-board the vehicle.

BRIEF DESCRIPTION OF THE FIGURES

The accompanying figures, where like reference numerals refer to identical or functionally similar elements throughout the separate views and which together, with the detailed description below, are incorporated in and form part of the specification, serve to further illustrate various embodiments and to explain various principles and advantages all in accordance with the present invention.

FIG. 2A is a front perspective view of the battery cabling counterbalance device with lowered charging arm in accordance with an embodiment of the invention.

Figure 1:
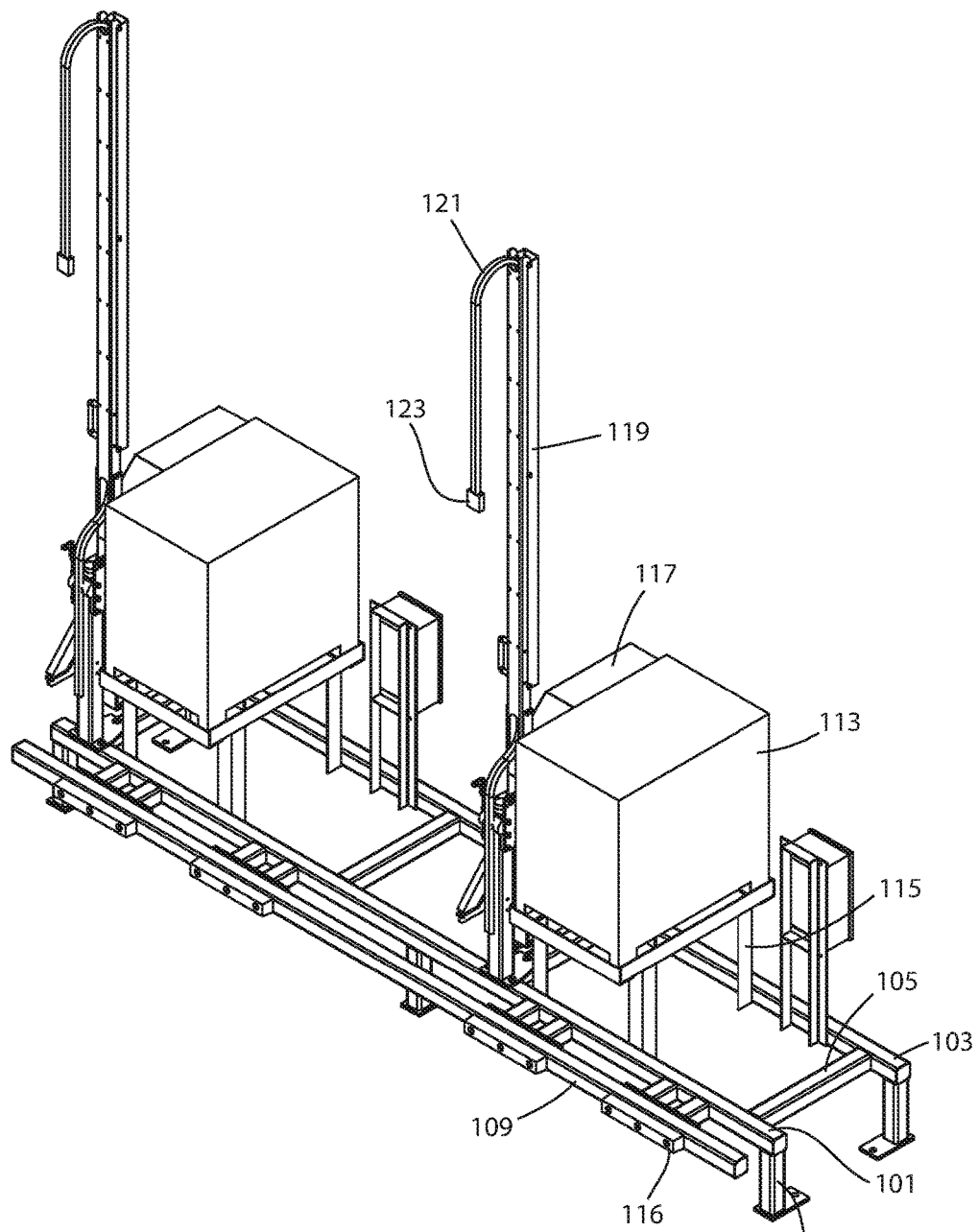
FIG. 1 is a front perspective view of a battery cabling counterbalance device with raised arm for use in charging an electric vehicle in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a forklift battery charging stand. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art, having the benefit of the description herein.

In this document, relational terms such as first and second, top and bottom, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. It will be appreciated that embodiments of the invention described herein may be comprised of one or more conventional processors and unique stored program instructions that control the one or more processors to implement, in conjunction with certain non-processor circuits, some, most, or all of the functions of a forklift battery charging stand described herein.

FIG. 1 is a front perspective view of the battery cabling counterbalance device used in an electric vehicle charging stand with raised charging arm in accordance with an embodiment of the invention. The battery cabling counterbalance device 100 includes a stand assembly having a front rail 101, back rail 103 and cross rail 105. The front rail 101, back rail 103 and cross rail 105 form a substantially rectangular frame or stand that uses legs 107 to raise the stand assembly approximately one foot off the ground. The stand assembly further includes a stop bar 109 positioned in front of the front rail 101 for providing a stop for forklift vehicles approaching the stand. The stop bar 109 further includes a bumper 116 for providing protection should the forklift come into contact with the stand assembly.

The battery cabling counterbalance device 100 further includes a battery charger housing 113 that connects to the stand assembly using charger legs 115. A counter weight housing 117 is positioned adjacent to the charger housing 113 and is used in connection with the charger arm 119. As will be further described herein, the charger arm 119 works with a charger power cord 121 and charger connector 123 in a manner so that the charger arm 119 can be lowered into position by the user to allow the forklift to be easily connected to a vehicular connector on the forklift.

Figure 2B:
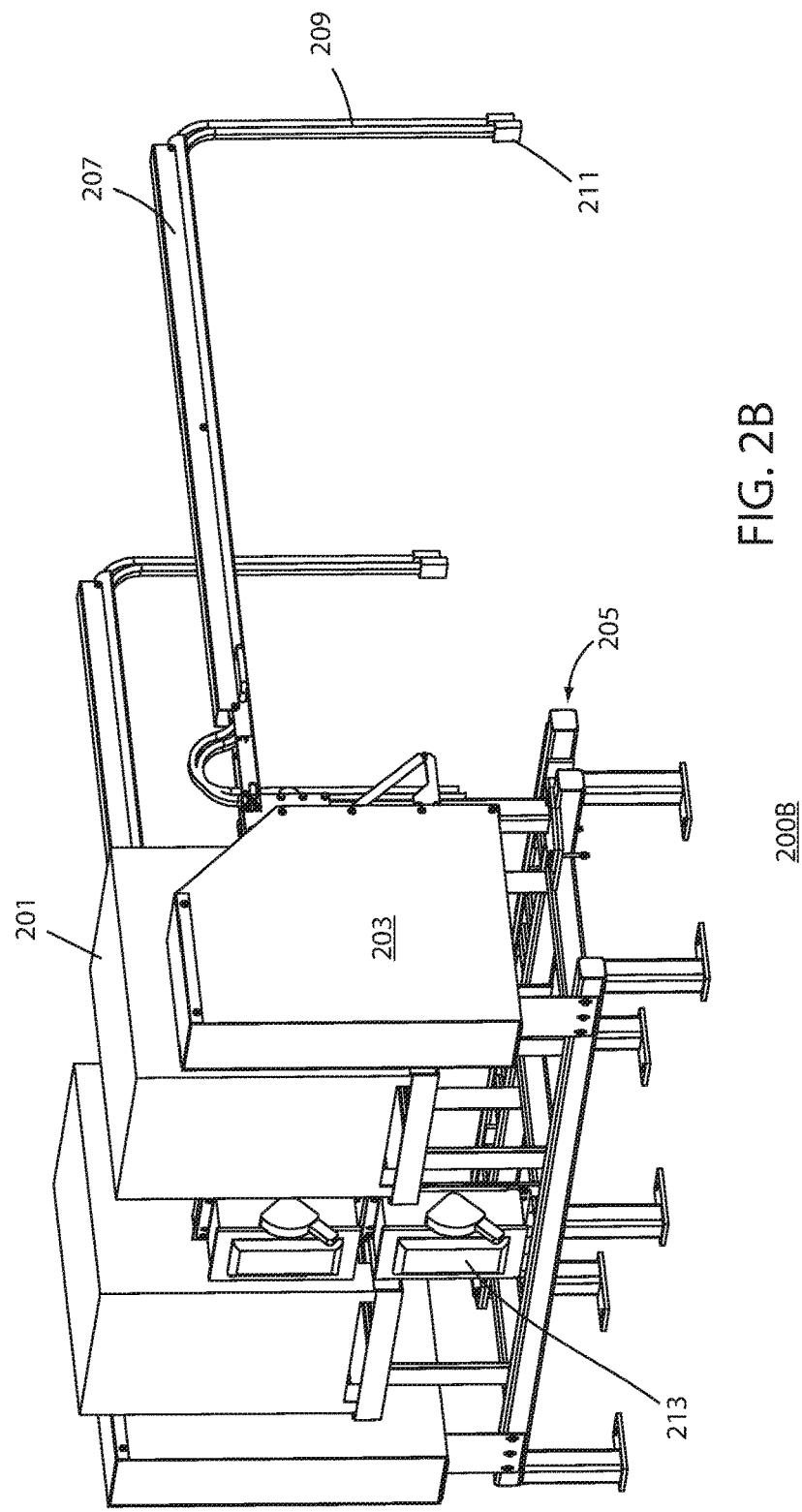
FIG. 2B is a rear perspective view of the battery cabling counterbalance device shown in FIG. 2A.

FIG. 2A is a front perspective view of the battery cabling counterbalance device with lowered charging arm in accordance with an embodiment of the invention. FIG. 2B is a rear perspective view of the battery cabling counterbalance device shown in FIG. 2A. With regard to the battery charging stand 200*a* in FIG. 2A, 200*b* in FIG. 2B, the counterbalance device includes a battery charger housing 201 that houses an electronic battery charging device for charging a battery on-board the forklift. A "gate" or counter weight housing 203 is positioned atop a stand assembly 205. The charging arm 207 works with a charging cable 209 that extends from the battery charger housing 201, such that the arm 207 can be raised or lowered for easily connecting an electrical charging connector 211 to a forklift positioned adjacent the charging arm 207. As best seen in FIG. 2B, a circuit breaker or safety switch 213 is positioned at the rear of the battery charging stand assembly 205, for providing an AC power cut off or disconnection in the event of high current defects or emergency.

Figure 3A:
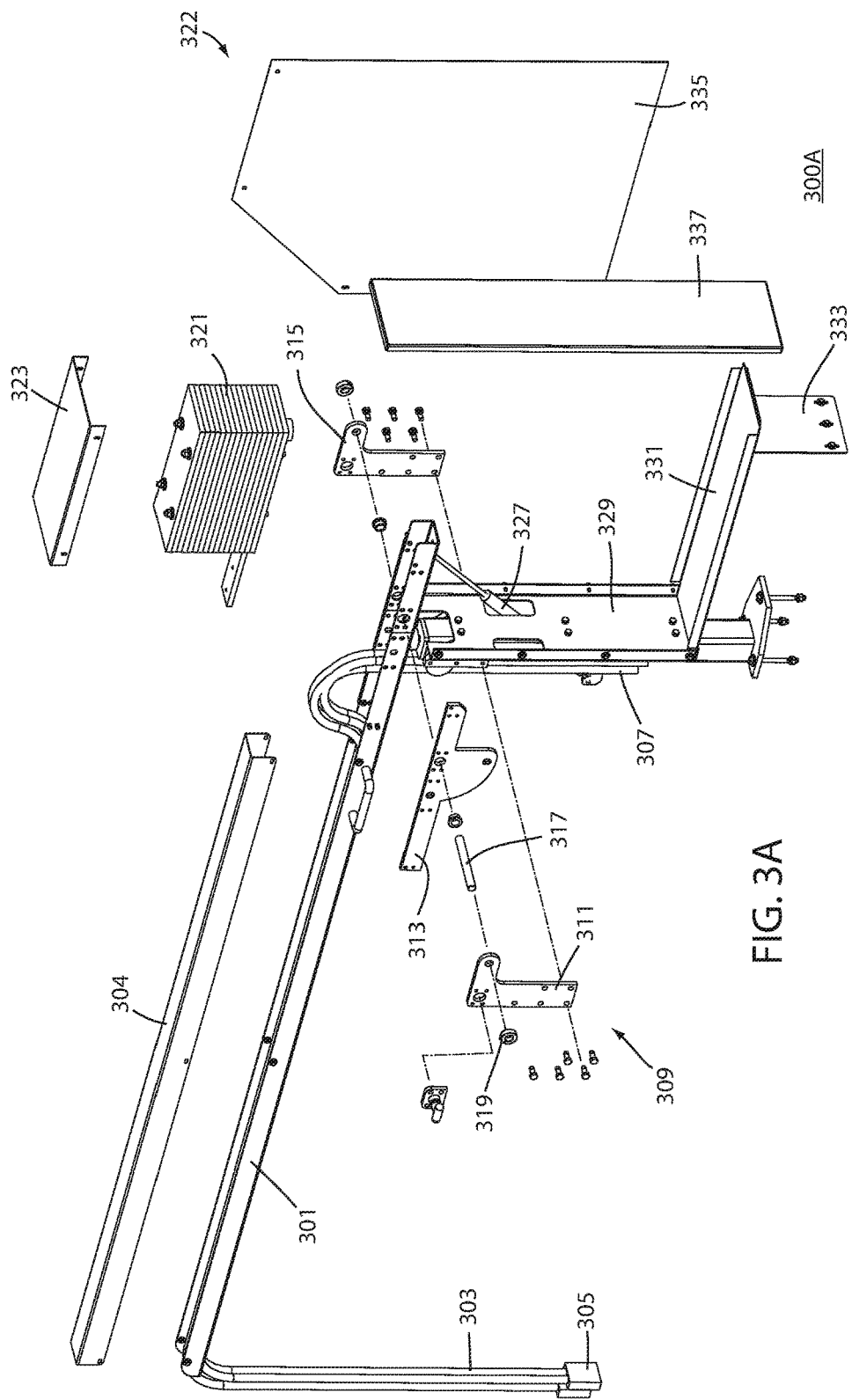
FIG. 3A is an exploded view of the left side of the battery cabling counterbalance device.
Figure 3B:
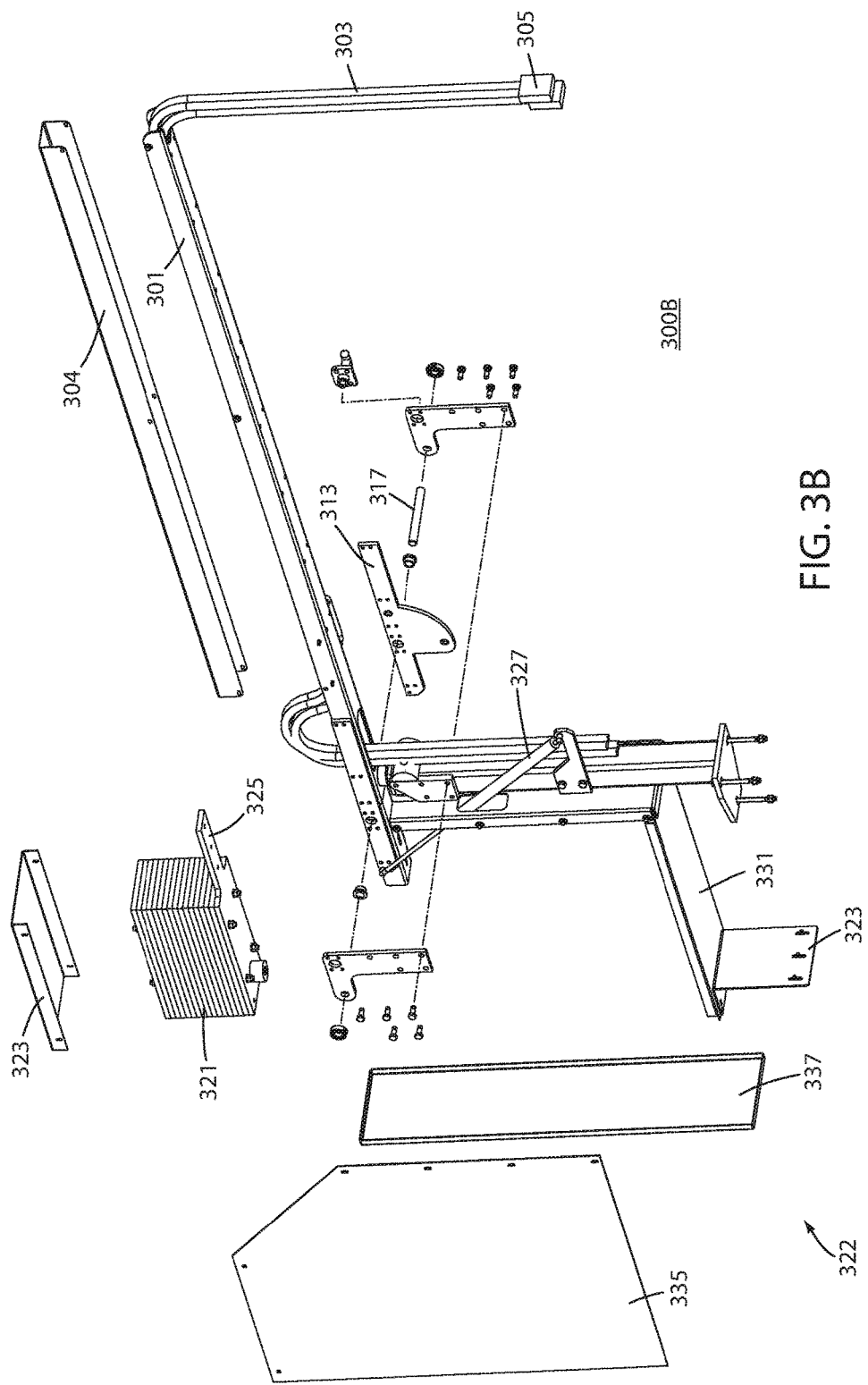
FIG. 3B is an exploded view of the right side of the battery cabling counterbalance device.

FIG. 3A is an exploded view of the left side of the battery cabling counterbalance device illustrating the charging arm assembly. FIG. 3B is an exploded view of the right side of the battery cabling counterbalance device. With regard to both FIG. 3A and FIG. 3B, the charging arm assembly 300 includes a U-shaped arm 301 that is configured such that a charging cable 303 is positioned within its channel. A cover 304 is positioned on top of the arm 301 for protecting the charging cable 303. The arm 301 has a proximal end and distal end where the charging cable 303 extends from an electric battery charger (not shown) at the proximal end of the arm 301. At the distal end, the charging cable 303 extends past the arm 301 by at least several feet. The charging cable 303 hangs downwardly, toward the floor, and can be moved or pulled with enough slack, for connection of the charging connector 305 to a forklift battery connector on the vehicle.

At the proximal end of the charging arm 301, the arm 301 is connected to a pivot post 307 that extends downwardly to a stand assembly (not shown). The pivot post 307 works with a pivot assembly 309 allowing the changing arm to rotate 90 degrees in an arc movement for raising and lowering the arm 301. The pivot assembly 309 includes a first pivot plate 311, second pivot plate 313 and third pivot plate 315 such that the second pivot plate 313 connects to a side section of the charging arm 301. The second pivot plate 313 is used with a pivot shaft 317 which runs through the first pivot plate 311, second pivot plate 313 and third pivot plate 315 to hold each of the pivot plates together with connecting fasteners and/or hardware 319. Those skilled in the art will recognize that the pivot shaft 317 provides a fulcrum or pivot point allowing the charging arm 301 to rotate about a connection point.

The charging arm 301 and the charging cable 303 make the overall weight of the charging arm 301 very heavy and difficult to move since the charging cable 303 is typically 00-gauge insulated wire or similar. In order to allow the charging arm 301 to be easily moved by a user, a counter weight 321 is attached to the proximal end of the charging arm 301. The counter weight 321 is typically assembled using a plurality of metallic plates so the overall weight or counter-load can be specially configured to work with the weight of the charging arm 301. This allows the user to easily and safely move the charging arm 301 about the fulcrum with little to no effort. As seen in FIG. 3, the counterweight includes a guard top 323 and an attachment bracket 325 for connecting the counter weight 321 to the end of the charging arm 301. A piston or dampener 327 extends between the pivot post 307 and the charging arm 301 and works to control the speed of movement of the charging arm 301 when moving between a raised and/or lowered position.

In order to guard and protect the counterweight 321 from damage, the counterweight 321 is enclosed in a counterweight housing 322 that includes a vertical guard mount 329 that is mounted to abut the side of the pivot post 307. A side guard mount 331 is attached to the vertical guard mount 329 where a support angle 333 is used to attach to the charging stand (not shown). A guard panel 335 and side panel 337 are attached to the vertical guard mount 329 and side guard mount 331 to form a box or enclosure used to house the counterweight 321 and its components.

Figure 4:
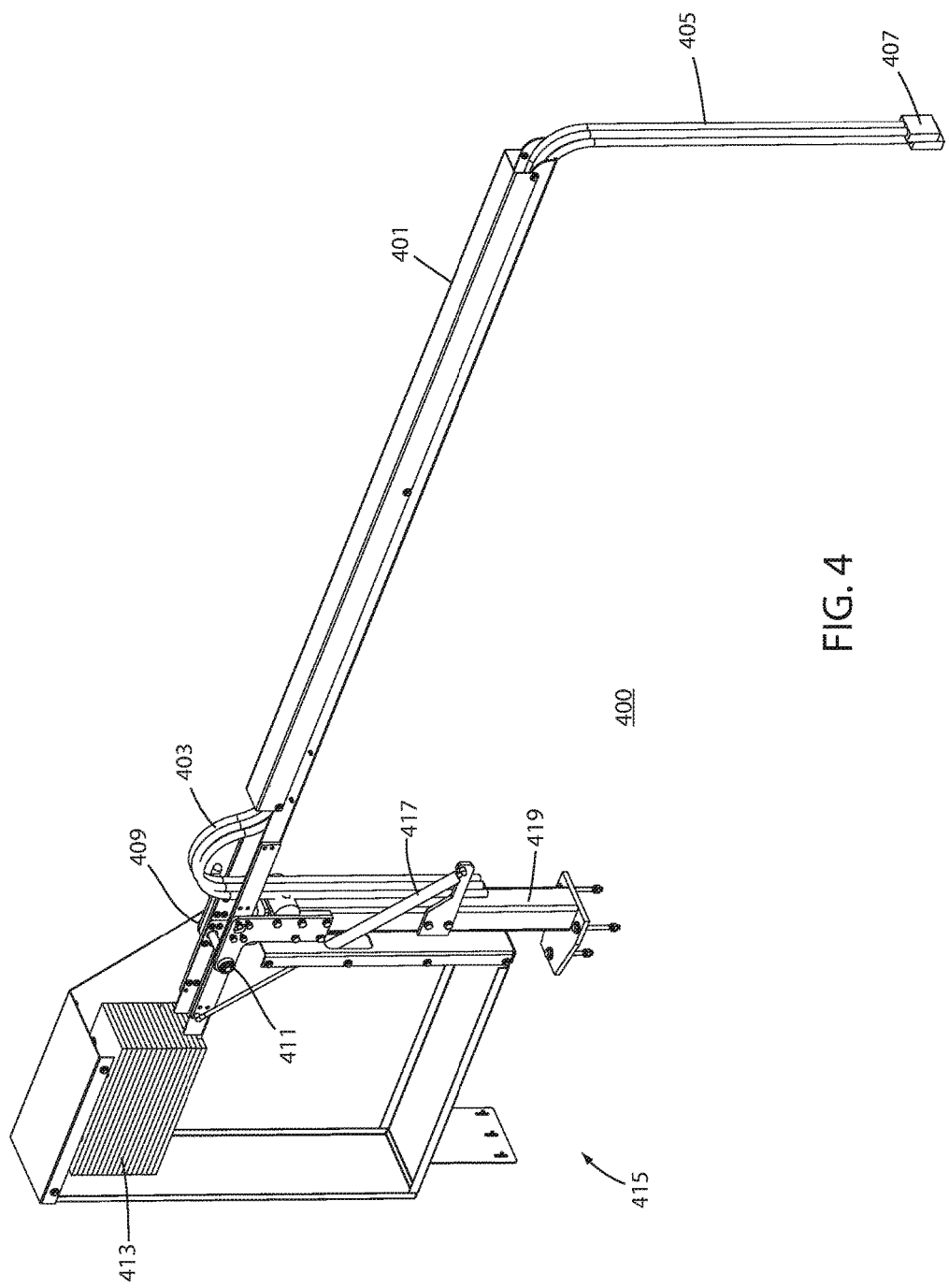
FIG. 4 is a magnified perspective view illustrating a lowered charging arm of the battery cabling counterbalance device.

FIG. 4 is a magnified perspective view illustrating an assembled charging arm where the charging arm assembly 400 includes the charging arm 401 that includes a charging cable 403 that extends from an end of the charging arm 401. A connecting portion 405 of the charging cable 403 hangs downwardly so that a charging connector 407 can be connected to a forklift battery when the changing arm 401 is in its lowered position. As described herein, the charging arm 401 pivots about a fulcrum 409 using fastening components to create a pivot point such as a pivot shaft 411. A counterweight 413 is attached to the proximal end of the charging arm 401 so to provide a counterforce to the weight created by the heavy charging cable 403. The counterweight 413 is positioned within a counterweight housing 415 for protecting and isolating the counterweight 413 from the environment. Finally, a dampener 417 connects between the charging arm 401 and a pivot post 419 for controlling the speed and movement of the charging arm 401 when moving between raised and lowered positions.

Thus, embodiments of the present invention are directed to battery cabling counterbalance device for use in charging the battery of an electric vehicle such as a fork-lift or loader includes a base portion having a bumper forming a docking section. A battery charger and charging cable are attached to the base portion. A charging arm having a proximal and distal end is used and includes a counterweight attached at the proximal end and the charging cable extends from the distal end. A dampener, such as a hydraulic piston, works to control movement of the charging arm so that the charging arm moves in an arc about a fulcrum so the charging cable can be connected to an electric vehicle when at the charging station.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, and solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A heavy cable counterbalance device comprising:
   a base portion having a plurality of legs;
   a battery charger having a charging cable configured on the base portion;
   a charging stand having a charging arm and counterweight where the counterweight is configured within a guard and is positioned at a distal end of the charging arm past a fulcrum and operates to move the entire charging arm and charging cable and where the weight of the charging cable is supported by the charging arm along its length and the counter-weight for minimizing charging cable weight and facilitating arcuate movement of the charging arm;
   a dampener extending between the charging arm and a supporting post for controlling the speed of movement of the charging arm; and
   wherein the charging arm is moves about a center of gravity such that the charging cable is presented to forklift positioned adjacent the base portion.

2. A heavy cable counterbalance device as in claim 1, wherein the base portion includes a docking section.

3. A heavy cable counterbalance device as in claim 2, wherein the docking section includes at least one bumper for preventing damage to the fork lift.

4. A heavy cable counterbalance device as in claim 1, further comprising a counterweight guard for isolating the counterweight when in motion.

5. A counterbalance device for use in a battery charging stand comprising:
  a base portion having at least one bumper forming a docking section;
  at least one battery charger and at least one charging cable attached to the base portion;
  at least one charging arm for supporting the at least one charging cable along it length such that at least one charging arm and at least one charging cable move together in an arcuate motion about a fulcrum using a counter-weight to minimize charging cable weight to the operator such that the counterweight moves the entire charging arm and charging cable about a center of gravity;
  a counterweight guard formed by an enclosure substantially surrounding the counterweight for isolating the counterweight when in motion; and
  wherein the charging cable is attached to the charging arm for connecting to a forklift vehicle when positioned at the docking section.

6. A counterbalance device as in claim 5, further comprising a pivot shaft extending through a pivot plate connected to the charging arm for facilitating movement of the charging arm and counterweight about the fulcrum.

7. A counterbalance device as in claim 5, further comprising at least one hydraulic dampener connected to the changing arm for controlling the speed for movement of the charging arm.

8. A counterbalance device as in claim 5, wherein the charging cable extends longitudinally along the changing arm extending over a distal edge therefrom.

9. A counterbalance device for use in charging an electric vehicle comprising:
  a base portion having at least one bumper forming a docking section;
  at least one battery charger and at least one charging cable attached to the base portion;
  a plurality of charging arms each having a proximal and distal end where a counterweight is attached at the proximal end and the at least one charging cable is supported by the at least one charging arm and extends from the distal end such that the respective counterweight moves each of the respective charging arms and its charging cable about a center of gravity;
  a counterweight guard formed by an enclosure substantially surrounding the counterweight for isolating the counterweight when in motion;
  a dampener for controlling the speed of movement of the charging arm; and
  wherein the at least one charging arm and charging cable move together in an arcuate motion about a fulcrum using the counter-weight positioned on one side of the fulcrum to minimize charging cable weight to the operator so the at least one charging cable can be connected to a forklift vehicle when at the docking section.

10. A counterbalance device as in claim 9, further comprising a pivot shaft extending through a pivot plate connected to the charging arm for facilitating movement of the charging arm and counterweight about the fulcrum.

11. A counterbalance device as in claim 9, wherein the dampener is a hydraulic piston.

* * * * *